United States Patent
Leonard et al.

(10) Patent No.: US 10,570,889 B2
(45) Date of Patent: Feb. 25, 2020

(54) ADAPTOR FOR WIND TURBINE REFURBISHMENT AND ASSOCIATED METHODS

(71) Applicant: General Electric Company, Schenectady, NY (US)

(72) Inventors: Jay F. Leonard, Greenville, SC (US); Joseph Lawrence Chacon, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/959,730

(22) Filed: Apr. 23, 2018

(65) Prior Publication Data

US 2019/0323488 A1 Oct. 24, 2019

(51) Int. Cl.
| | | |
|---|---|---|
| F03D 80/80 | (2016.01) | |
| F03D 9/25 | (2016.01) | |
| F03D 1/06 | (2006.01) | |
| F03D 80/50 | (2016.01) | |
| F03D 80/70 | (2016.01) | |
| H02J 3/38 | (2006.01) | |
| H02M 5/44 | (2006.01) | |

(52) U.S. Cl.
CPC ............... F03D 80/82 (2016.05); F03D 1/06 (2013.01); F03D 9/25 (2016.05); F03D 80/50 (2016.05); F03D 80/70 (2016.05); *H02J 3/386* (2013.01); *H02M 5/44* (2013.01)

(58) Field of Classification Search
CPC .................................. F03D 80/82; F03D 9/25
See application file for complete search history.

(56) References Cited

U.S. PATENT DOCUMENTS

| | | | |
|---|---|---|---|
| 8,277,184 B2 | 10/2012 | Nies et al. | |
| 8,826,614 B2 | 9/2014 | Garcia Maestre et al. | |
| 9,982,659 B1* | 5/2018 | Leonard | E04H 12/085 |
| 2006/0228218 A1* | 10/2006 | Cone | E04H 12/085 |
| | | | 416/244 A |
| 2006/0233645 A1 | 10/2006 | Wobben | |
| 2007/0296220 A1* | 12/2007 | Kristensen | F03D 13/10 |
| | | | 290/55 |

(Continued)

FOREIGN PATENT DOCUMENTS

| | | |
|---|---|---|
| DE | 102017/004995 U1 | 10/2017 |
| EP | 3282122 A1 | 2/2018 |

OTHER PUBLICATIONS

U.S. Appl. No. 15/423,872, filed Feb. 3, 2017.
Extended European Search Report Corresponding to Application No. 19170648 dated Sep. 11, 2019.

*Primary Examiner* — Sean Gugger
(74) *Attorney, Agent, or Firm* — Dority & Manning, P.A.

(57) ABSTRACT

The present disclosure is directed to a wind turbine. The wind turbine includes a tower, a machine head having a generator, and a rotor mechanically coupled to the generator. The rotor includes a hub and a plurality of rotor blades coupled to and extending outwardly from the hub. The wind turbine also includes an adaptor coupled between the tower and the machine head, with the adaptor defining an interior chamber. Furthermore, the wind turbine includes one or more electrical components electrically coupled to the generator, with the one or more electrical components being positioned within the interior chamber defined by the adaptor.

20 Claims, 10 Drawing Sheets

(56) References Cited

U.S. PATENT DOCUMENTS

| | | | |
|---|---|---|---|
| 2008/0040983 A1 | 2/2008 | Fernandez Gomez et al. | |
| 2010/0139180 A1* | 6/2010 | Meiners | F03D 13/10 52/111 |
| 2010/0170429 A1* | 7/2010 | Siegfriedsen | B63B 35/44 114/268 |
| 2011/0109106 A1 | 5/2011 | Inda | |
| 2011/0138595 A1* | 6/2011 | Shiraishi | F03D 80/50 29/402.03 |
| 2011/0140447 A1* | 6/2011 | Paura | E04H 12/085 290/55 |
| 2011/0223035 A1* | 9/2011 | Paura | E04H 12/085 416/244 R |
| 2011/0309629 A1* | 12/2011 | Larsen | F03D 80/82 290/55 |
| 2012/0131876 A1 | 5/2012 | Nies | |
| 2012/0146335 A1* | 6/2012 | Bywaters | F03D 13/20 290/55 |
| 2012/0168116 A1* | 7/2012 | Mello | F03D 13/25 165/47 |
| 2012/0223523 A1 | 9/2012 | Bertolotti et al. | |
| 2012/0311948 A1* | 12/2012 | Hangel | B66C 1/66 52/295 |
| 2013/0180199 A1 | 7/2013 | Vadlamudi et al. | |
| 2013/0193691 A1* | 8/2013 | Mehta | F03D 13/10 290/55 |
| 2013/0224013 A1 | 8/2013 | De Broe | |
| 2014/0102039 A1* | 4/2014 | Wagner | E04H 12/342 52/745.18 |
| 2014/0230343 A1* | 8/2014 | Lam | E04H 12/085 52/40 |
| 2015/0027068 A1* | 1/2015 | Sayers | E02D 27/425 52/173.1 |
| 2015/0226179 A1 | 8/2015 | Neumann et al. | |
| 2015/0285225 A1 | 10/2015 | Ollgaard | |
| 2016/0215762 A1* | 7/2016 | Rohden | E04H 12/085 |
| 2016/0315476 A1* | 10/2016 | Gomis | H02M 7/04 |
| 2017/0022966 A1 | 1/2017 | Therkildsen | |
| 2017/0030328 A1 | 2/2017 | Gudewer et al. | |
| 2017/0211547 A1 | 7/2017 | Thomas et al. | |
| 2018/0038350 A1* | 2/2018 | Leonard | F03D 9/25 |
| 2018/0313333 A1* | 11/2018 | Lleyda Dionis | F03D 13/20 |
| 2018/0335022 A1* | 11/2018 | Leonard | E02D 27/425 |
| 2019/0264661 A1* | 8/2019 | Donescu | F03D 80/50 |

* cited by examiner

ADAPTOR FOR WIND TURBINE REFURBISHMENT AND ASSOCIATED METHODS

FIELD

The present disclosure generally relates to wind turbines. More particularly, the present disclosure relates to adaptors for facilitating refurbishment of wind turbines and associated methods.

BACKGROUND

Wind power is considered one of the cleanest, most environmentally friendly energy sources presently available, and wind turbines have gained increased attention in this regard. A modern wind turbine typically includes a tower and a machine head mounted on the tower. The machine head may include a generator and one or more rotor blades. The rotor blades convert kinetic energy of wind into mechanical energy using known airfoil principles. A drivetrain transmits the mechanical energy from the rotor blades to the generator, which, in turn, converts the mechanical energy to electrical power. Thereafter, electrical components of the wind turbine, such as a power converter and a transformer, transmit the electrical power from the generator to a utility grid.

Wind turbine technology is rapidly progressing. In this respect, it may be desirable to refurbish a used wind turbine when the technology therein becomes outdated and/or the used wind turbine approaches the end of its design life. In general, refurbishment may provide various advantages, such as the implementation of newer, more efficient technology and components. In many cases, during refurbishment, the used machine head may be removed from the used tower and replaced with a new, more technologically advanced machine head.

During such refurbishments, the power converter and/or transformer may also be upgraded. Typically, these electrical components are fairly large, thereby necessitating installation within the lower portion of the tower. Removal and replacement of the used power converter and/or transformer from the lower portion of the tower is difficult, time-consuming, and expensive. As such, the used power converter and transformer are electrically disconnected from the generator and grid and left in the lower portion of the tower during such refurbishments. In this respect, a new power converter and transformer are positioned within a building or other structure constructed near the wind turbine tower and electrically coupled to the generator and the grid. Nevertheless, the construction of a structure to house the new transformer and power converter increases the overall expense of the refurbishment.

Accordingly, an improved apparatus and method for refurbishing wind turbines would be welcomed in the art.

BRIEF DESCRIPTION

Aspects and advantages of the technology will be set forth in part in the following description, or may be obvious from the description, or may be learned through practice of the technology.

In one aspect, the present disclosure is directed to a wind turbine. The wind turbine includes a tower, a machine head having a generator, and a rotor mechanically coupled to the generator. The rotor includes a hub and at least one rotor blade coupled to and extending outwardly from the hub. The wind turbine also includes an adaptor coupled between the tower and the machine head, with the adaptor defining an interior chamber. Furthermore, the wind turbine includes one or more electrical components electrically coupled to the generator, with the one or more electrical components being positioned within the interior chamber defined by the adaptor.

In another aspect, the present disclosure is directed to a wind turbine including a tower having a top flange, a machine head having a generator and a bedplate, and a rotor mechanically coupled to the generator. The rotor includes a hub and at least one rotor blade coupled to and extending outwardly from the hub. The wind turbine also includes a yaw bearing having a first race and a second race. The wind turbine further includes an adaptor coupled between the yaw bearing and one of the tower or the machine head. The adaptor defines an interior chamber. The adaptor further includes a top flange and a bottom flange, with the top flange of the adaptor being coupled to one of the bedplate of the machine head or the yaw bearing and the bottom flange being coupled to one of the top flange of the tower or the yaw bearing. Furthermore, the wind turbine includes one or more electrical components electrically coupled to the generator, with the one or more electrical components being positioned within the interior chamber defined by the adaptor.

In a further aspect, the present disclosure is directed to a method for refurbishing a wind turbine. The method includes removing a used machine head from a used tower of the wind turbine. The method also includes coupling an adaptor to a new machine head, with the adaptor defining an interior chamber and one or more electrical components positioned within the interior chamber. Furthermore, the method includes coupling the adaptor to the used tower and electrically coupling the one or more electrical components positioned within the interior chamber of the adaptor to a grid.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
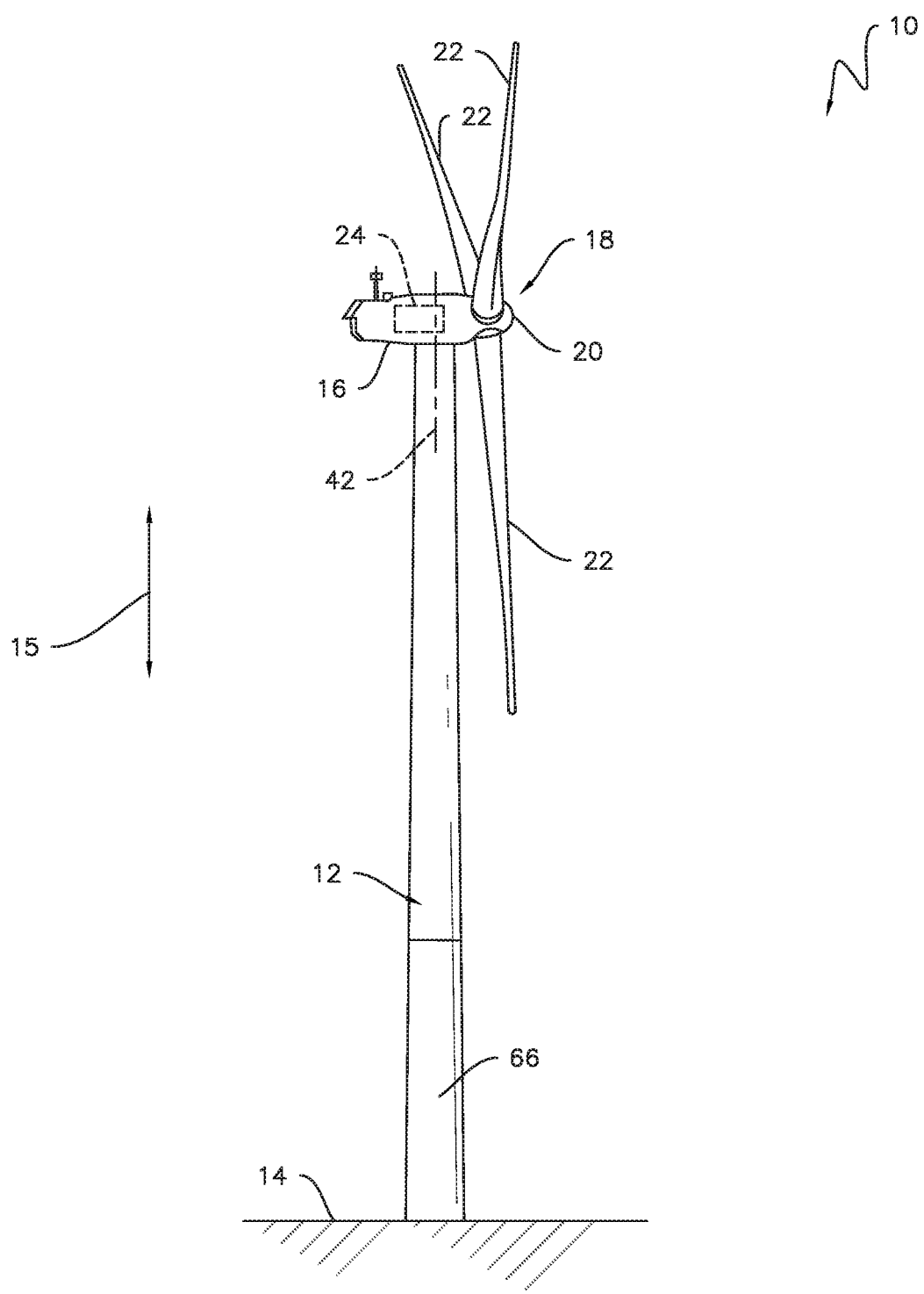
FIG. 1 is a perspective view of one embodiment of a used wind turbine in accordance with aspects of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

The wind turbines and various components of these wind turbines disclosed herein are described below as "used," "new," or "refurbished." In general, a used wind turbine is any wind turbine prior to refurbishment, whether or not such wind turbine has actually been used to generate power. A used component (e.g., a machine head, a power converter, a transformer, etc.) is any component being replaced, upgraded, and/or changed during refurbishment. As such, a used component may be removed from the used wind turbine and replaced with a corresponding new component in its place (e.g., a machine head). Alternatively, a used component may be operably decoupled from the used wind turbine, but remain physically present within the used wind turbine (e.g., various electrical components). In such instances, the corresponding new component is installed at another location within the wind turbine. A new component is any component being installed within the used wind turbine as part of the refurbishment, whether or not such component is actually unused. As such, a used component removed from a first wind turbine and installed in a second wind turbine as part of a refurbishment operation is still a new component in the context of the second wind turbine. Furthermore, new components may generally be technologically superior to the corresponding used components. In certain instances, however, the new component may be the same as or technologically inferior to (e.g., to reduce cost, weight, complexity, etc.) the new component. In this respect, a used component is any component present within the wind turbine prior to refurbishment, while a new component is any component present within the wind turbine after refurbishment that was not present prior to refurbishment. Moreover, a refurbished wind turbine refers to any wind turbine after a refurbishment operation is completed.

Referring now to the drawings, FIG. 1 is a perspective view of one embodiment of a used wind turbine 10. As shown, the used wind turbine 10 generally includes a used tower 12 extending outwardly from a support surface 14 along a vertical direction 15 and a used machine head 16 mounted on the used tower 12. The used machine head 16 may include a rotor 18 having a rotor hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotation of the rotor 18 to convert kinetic energy from the wind into usable rotational, mechanical energy. The used machine head 16 may also include an electric generator 24 configured to generate electrical power from the rotational energy of the rotor 18.

Figure 2:
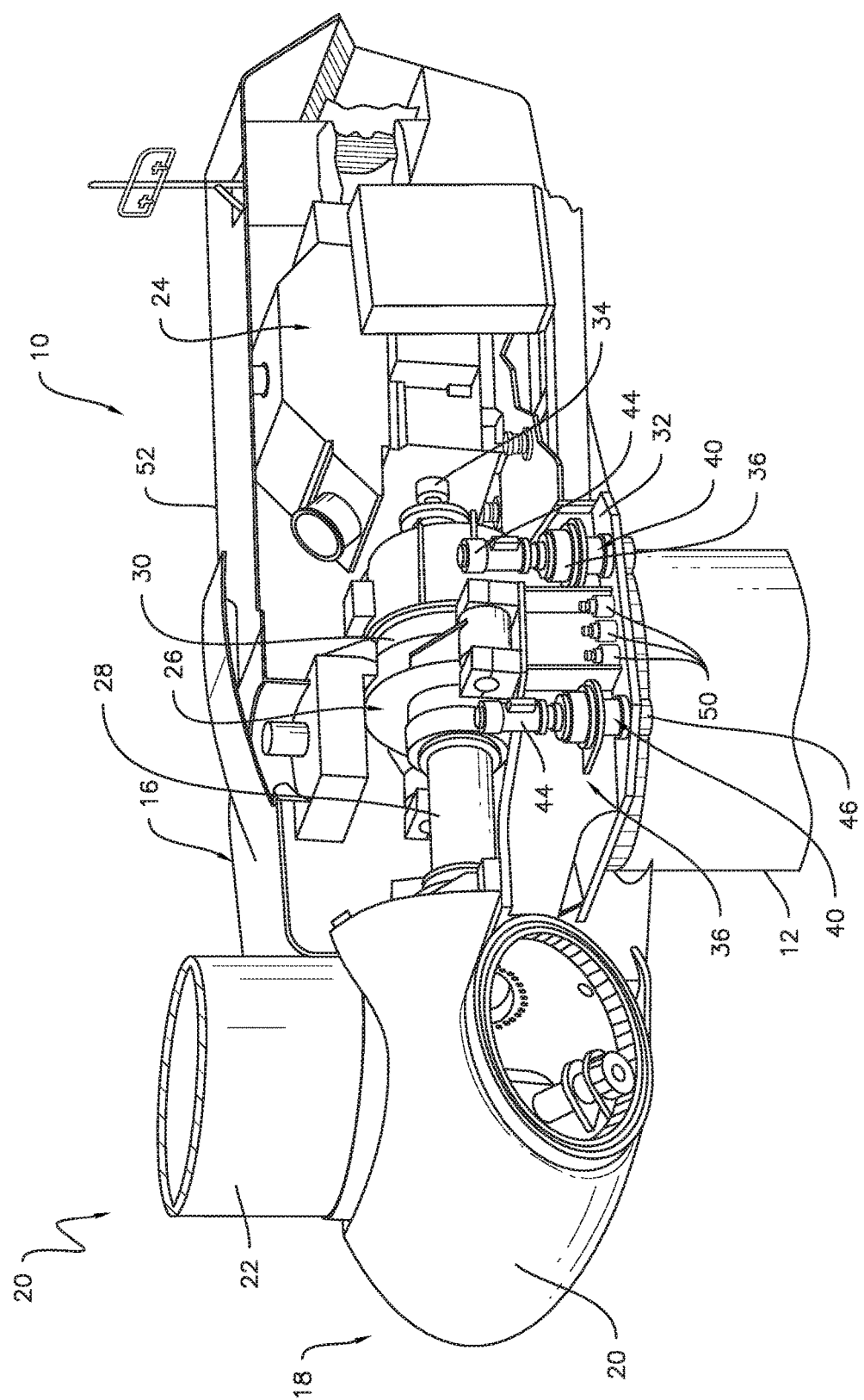
FIG. 2 is a perspective, internal view of one embodiment of a used machine head in accordance with aspects of the present disclosure.

Referring now to FIG. 2, the used machine head 16 may include a drivetrain 26 coupled the rotor 18 to the generator 24. As shown, the drivetrain 26 may include a rotor shaft 28, which couples the rotor hub 20 to a gearbox 30. The gearbox 30 may be supported by and coupled to a bedplate 32 of the used machine head 16. The drivetrain 26 also include a generator shaft 34, which couples the gearbox 30 to the generator 24. In this respect, rotation of the rotor 18 drives the generator 24. More specifically, the rotor shaft 28 may provide a low speed, high torque input to the gearbox 30 in response to rotation of the rotor blades 22 and the hub 20. The gearbox 30 may then convert the low speed, high torque input into a high speed, low torque output to drive the generator shaft 34 and, thus, the generator 24.

Figure 3:
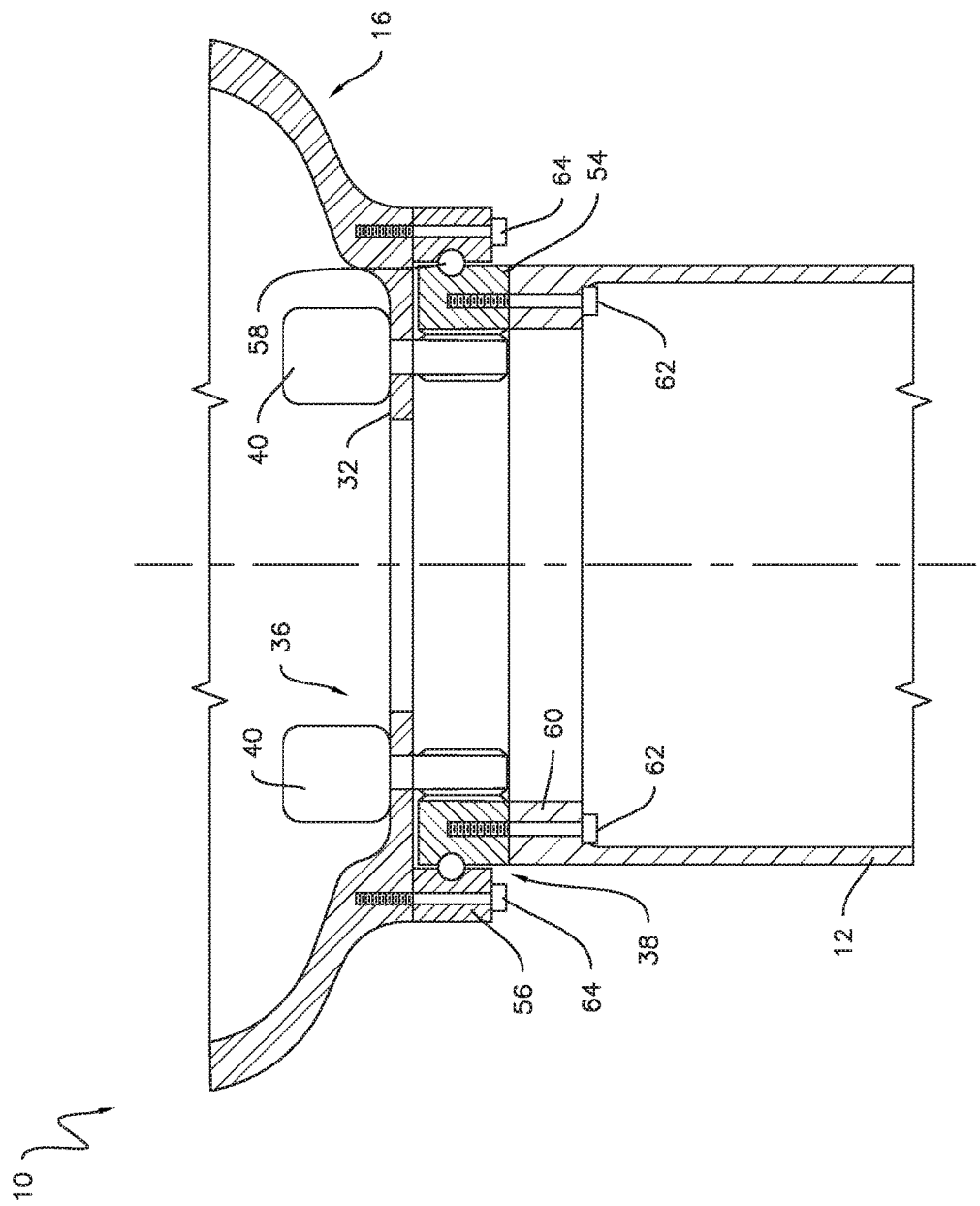
FIG. 3 is a cross-sectional view of one embodiment of a used wind turbine, illustrating components coupling a used machine head of the used wind turbine to a used tower of the used wind turbine in accordance with aspects of the present disclosure.

The used wind turbine 10 may include a used yaw drive 36 for adjusting a yaw angle of the used machine head 16 (i.e., the angular orientation of the used machine head 16 relative to the used tower 12). In particular, the used machine head 16 may be rotatably coupled to the tower 12 by a used yaw bearing 38 (FIG. 3). As such, the used yaw drive 36 may include one or more used yaw adjustment mechanisms 40, which rotate the used machine head 16 about a yaw axis 42 (FIG. 1) relative to the used tower 12 to adjust the yaw angle of the used machine head 16. Although FIG. 2 illustrates two used yaw adjustment mechanisms 40, the used wind turbine 10 may include any suitable number of used yaw adjustment mechanisms 40, such as a single used yaw adjustment mechanism 40 or more than two used yaw adjustment mechanisms 40. For example, certain embodiments of the used yaw drive 36 may include four used yaw adjustment mechanisms 40.

FIG. 2 illustrates an exemplary embodiment of the used yaw adjustment mechanisms 40. More specifically, each used yaw adjustment mechanism 40 may include an electric motor 44 mounted to and/or through the bedplate 32. Each electric motor 44 may include a pinion gear 46 coupled thereto, which engages a stationary race of a used yaw bearing 38 (FIG. 3) mechanically coupled to the used tower 12. During operation of the used yaw adjustment mechanisms 40, the electric motors 44 rotate the corresponding pinion gears 46, which rotate the used yaw bearing 38. The rotation of the pinion gears 46 relative to the used yaw bearing 38 causes the used machine head 16 to rotate about the yaw axis 42 (FIG. 1). In alternate embodiments, the used yaw adjustment mechanisms 40 may include any suitable type of actuator and/or any suitable structure or mechanism for transmitting movement between the used tower 12 and the used machine head 16.

The used yaw drive 36 may also include one or more brake assemblies 50 for controlling the rotation of the used machine head 16 about the yaw axis 42 (FIG. 1). For example, as shown in the illustrated embodiment, the brake assemblies 50 may be mounted to and/or through the bedplate 32. As such, each brake assembly 50 may frictionally engage the stationary race of a used yaw bearing 38 or another suitable friction surface of the used wind turbine 10 to stop, slow, and/or otherwise control the rotation of the used machine head 16 about the yaw axis 42. The used wind turbine 10 may include any suitable number of brake assemblies 50. For instance, in an exemplary embodiment, the used wind turbine 10 may include between twelve and twenty brake assemblies 50. In other embodiments, however, the used wind turbine 10 may include less than twelve brake assemblies 50 or more than twenty brake assemblies 50.

Furthermore, the used machine head 16 may include a nacelle 52 that surrounds and encloses various components (e.g., the generator 24, the drivetrain 26, etc.) of the used machine head 16. In general, the bedplate 32 and the nacelle 52 may form the outer surface(s) of the used machine head 16.

FIG. 3 illustrates various aspects of the used yaw drive 36 in greater detail. As mentioned above, the used yaw drive 36 may include the used yaw bearing 38 coupled between the used tower 12 and the used machine head 16. More specifically, the used yaw bearing 38 may include a first or inner race 54, a second or outer race 56 positioned around the inner race 54, and a plurality of rolling elements 58 (e.g., rollers, balls, cones, needles, etc.) positioned between the inner and outer races 54, 56. As shown, in one embodiment, the inner race 54 may be coupled to a top flange 60 of the used tower 12 by suitable fasteners 62. Similarly, the outer race 56 may be coupled to the bedplate 32 of the used machine head 16 by suitable fasteners 64. Nevertheless, in alternative embodiments, the inner race 54 may be coupled to the bedplate 32 of the used machine head 16 and the outer race 56 may be coupled to the top flange 60 of the used tower 12. Moreover, in further embodiments, the used yaw bearing 38 may have any other suitable configuration.

Figure 4:
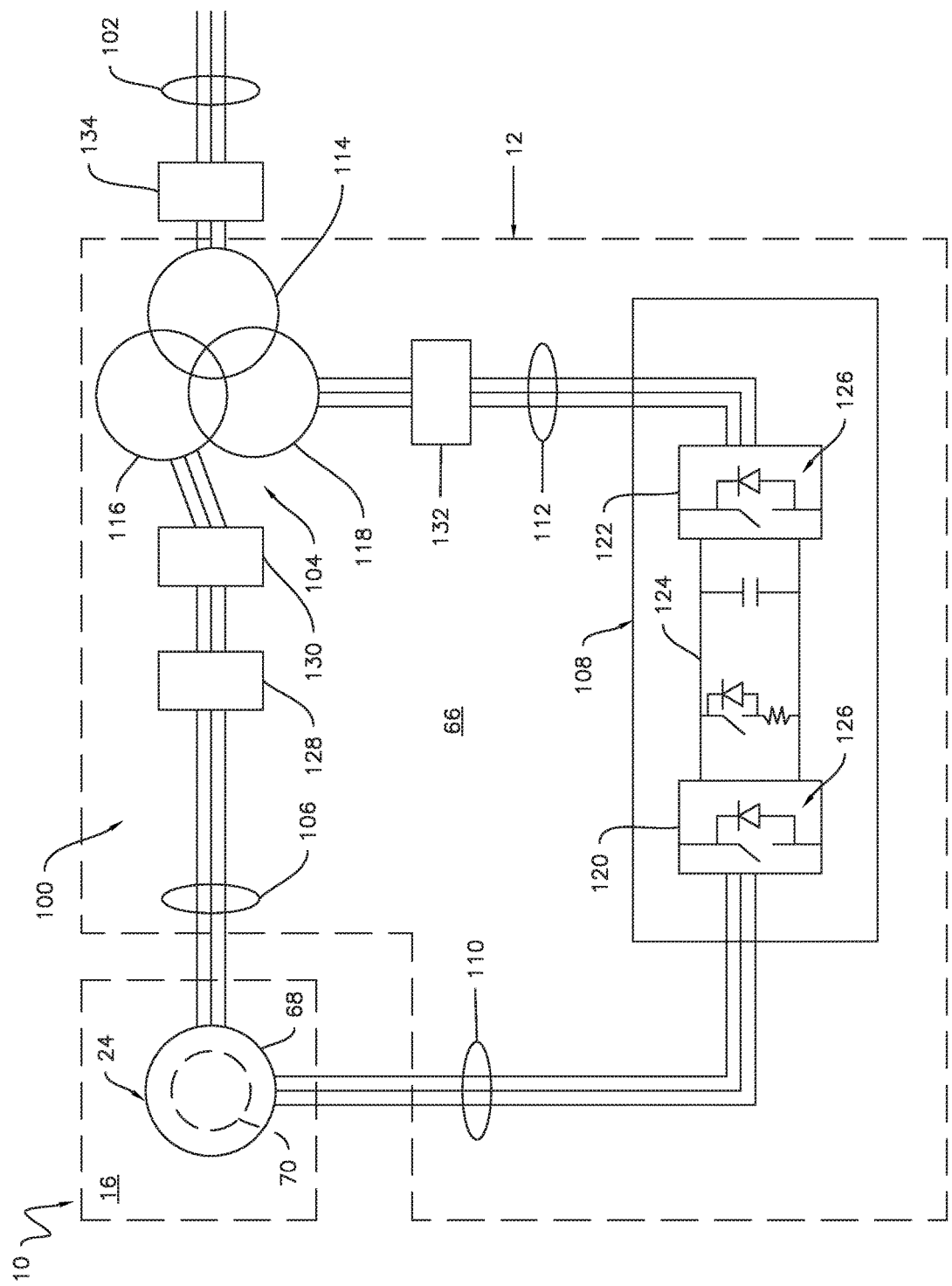
FIG. 4 is a schematic view of one embodiment of a used electrical system of a used wind turbine in accordance with aspects of the present disclosure.

Referring now to FIG. 4, the used wind turbine 10 includes a used electrical system 100 that supplies electrical power generated by the generator 24 to a utility grid 102. As shown, the used electrical system 100 may include various electrical components (e.g., power converters, transformers, etc.) positioned within the used tower 12. For example, in one embodiment, the various electrical components are positioned within a lower portion 66 of the used tower 12. As shown in FIG. 1, the lower portion 66 of the used tower 12 corresponds to the portion of the used tower 12 positioned proximate to the support surface 14. For example, in one embodiment, the lower portion 66 of the used tower 12 may be the bottom thirty percent of the used tower 12. Nevertheless, in alternative embodiments, the lower portion 66 of the used tower 12 may be less than the bottom thirty percent of the used tower 12, such as the bottom twenty percent of the used tower 12, or more than the bottom thirty percent of the used tower 12, such as the bottom forty percent of the used tower 12. In further embodiments, the various components of the electrical system 100 may be located any other suitable location within the used wind turbine 10 or remote to the used wind turbine 10.

As shown, the used electrical system 100 may be configured to provide AC power to the utility grid 102 via a dual path. More specifically, in the illustrated embodiment, the generator 24 corresponds to a doubly-fed induction generator configured to generate, e.g., three-phase AC power. In this respect, a stator 68 of the generator 24 may be coupled to a used transformer 104 via a stator bus 106. A rotor 70 of the generator 24 may be coupled to a used power converter 108 via a rotor bus 110. The used power converter 108 may, in turn, be coupled to the used transformer 104 via a grid side bus 112. The used transformer 104 may, in turn, be coupled to the utility grid 102. Nevertheless, in alternative embodiments, the generator 24 may be coupled to the grid 102 in any other suitable manner such that power produced by the generator 24 is supplied to the grid 102.

In the embodiment shown in FIG. 4, the used transformer 104 corresponds to a three-phase, three-winding transformer. As such, the used transformer 104 includes a high voltage (e.g., greater than 12 kVAC) primary winding 114 coupled to the utility grid 102, a medium voltage (e.g., 6 kVAC) secondary winding 116 coupled to the stator bus 106, and a low voltage (e.g., 690 VAC) auxiliary winding 118 coupled to the grid side bus 112. Alternatively, the used transformer 104 may have only two windings (e.g., a primary winding 114 and a secondary winding 116), four windings (e.g., a primary winding 114, a secondary winding 116, an auxiliary winding 118, and an additional winding), or any other suitable number of windings.

As shown in FIG. 4, the used power converter 108 generally includes a rotor side converter 120 coupled to the rotor side bus 110 and a grid side converter 122 coupled to the grid side bus 112. The used power converter 108 also includes a DC link 124 coupled between the rotor side and grid side converters 120, 122. In one embodiment, the rotor side converter 120 corresponds to an AC-DC converter configured to convert AC power from the rotor 70 of the generator 24 into DC power for delivery to the DC link 124. Furthermore, the grid side converter 122 corresponds to a DC-AC converter configured to convert DC power from the DC link 124 into AC power suitable for delivery to the utility grid 102. The rotor side and grid side converters 120, 122 may include various switching devices 126, such as insulated gate bipolar transistors, insulated gate commuted thyristors, metal-oxide semiconductor field-effect transistors, and/or silicon controlled rectifiers. In general, the switching devices 126 may be modulated to adjust or otherwise modify various parameters of the power produced by the generator 24 (e.g., change the frequency, convert AC to DC, convert DC to AC, etc.) such that power is suitable for consumption in the grid 102. In alternative embodiments, however, the used power converter 108 may have any other suitable topology.

Moreover, the used electrical system 100 may include various circuit breakers, switches, fuses, contactors, and/or the like to selectively electrically couple and/or decouple various components from the generator 24 and/or the grid 102. For example, in the embodiment shown in FIG. 4, the used electrical system 100 may include a switch 128, a stator bus circuit breaker 130, a grid side bus circuit breaker 132, and a grid circuit breaker 134. Nevertheless, in alternative embodiments, the used electrical system 100 may include other circuit breakers, switches, fuses, and/or contactors in lieu of or in addition to the components 128, 130, 132, 134.

Figure 5:
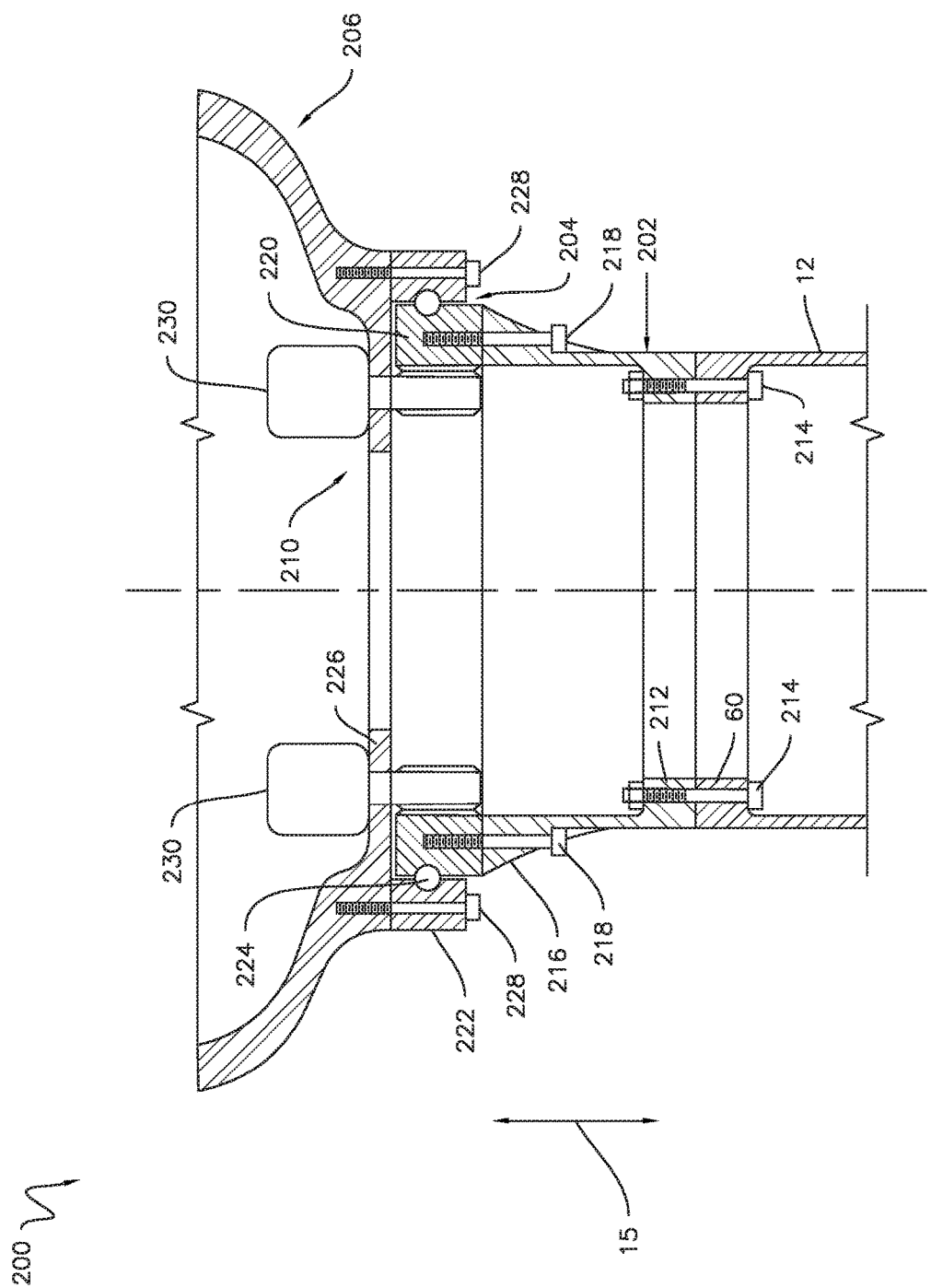
FIG. 5 is a cross-sectional view of one embodiment of a refurbished wind turbine, illustrating an adaptor coupled between a used tower and a yaw bearing in accordance with aspects of the present disclosure.
Figure 6:
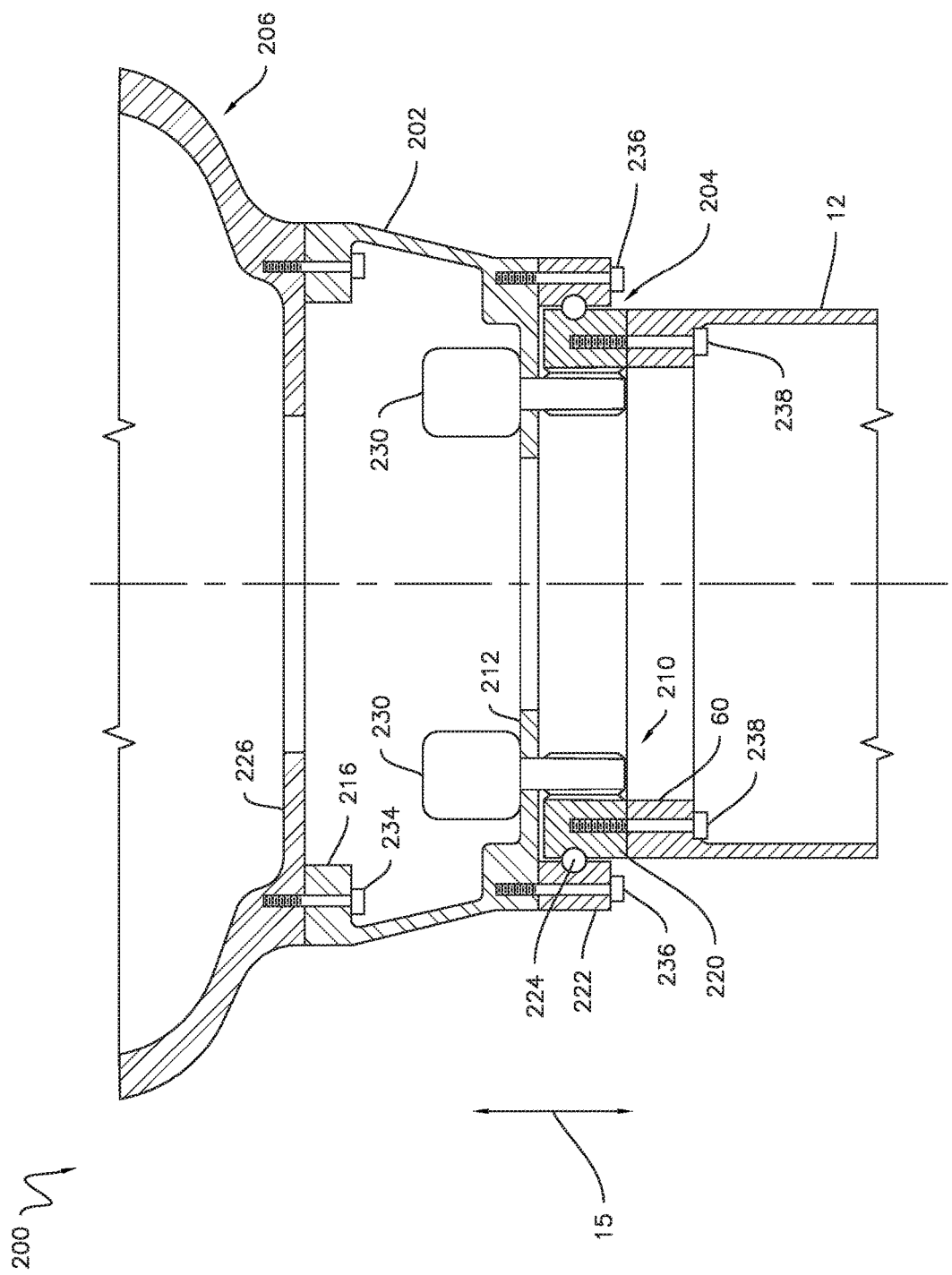
FIG. 6 is a cross-sectional view of one embodiment of a refurbished wind turbine, illustrating an adaptor coupled between a new machine head and a yaw bearing in accordance with aspects of the present disclosure.

FIGS. 5 and 6 illustrate embodiments of a refurbished wind turbine 200 in accordance with aspects of the present disclosure. Specifically, FIG. 5 illustrates one embodiment of the refurbished wind turbine 200 in which an adaptor 202 is between the used tower 12 and a new yaw bearing 204 of a new yaw drive 210. Conversely, FIG. 6 illustrates another embodiment of the refurbished wind turbine 200 in which the adaptor 202 is between the new yaw bearing 204 and a new machine head 206.

In general, the refurbished wind turbine 200 is formed by upgrading, replacing, or otherwise changing one or more components of the used wind turbine 10. For example, in the embodiments shown in FIGS. 5 and 6, the used machine head 16 is removed from the used tower 12 of the used wind turbine 10 and the new machine head 206 is coupled to the used tower 12 by the adaptor 202 to form the refurbished wind turbine 200. Additionally, as will be described below with respect to FIG. 7, the refurbished wind turbine 200 also includes a new electrical system 300 having one or more components positioned within the adaptor 202.

As mentioned above, in the embodiment illustrated in FIG. 5, the refurbished wind turbine 200 includes the adaptor 202 coupled between the used tower 12 and the new yaw bearing 204 (e.g., along the vertical direction 15). More specifically, the adaptor 202 includes a bottom flange 212 coupled to the top flange 60 of the used tower 12, such as via suitable fasteners 214. The adaptor 202 also includes a top flange 216 coupled to the new yaw bearing 204, such as via suitable fasteners 218. As shown, the new yaw bearing 204 may include an inner race 220, an outer race 222 positioned around the inner race 220, and a plurality of rolling elements 224 (e.g., rollers, balls, cones, needles, etc.) positioned between the inner and outer races 220, 222. For example, in one embodiment, the inner race 220 may be coupled to the top flange 216 of the adaptor 202 by the fasteners 218. Similarly, the outer race 222 may be coupled to a bedplate 226 of the new machine head 206 by suitable fasteners 228. Nevertheless, in alternative embodiments, the inner race 220 may be coupled to the bedplate 226 of the new machine head 206 and the outer race 222 may be coupled to the top flange 216 of the adaptor 202. Furthermore, the new yaw bearing 204 may have any other suitable configuration. Additionally, the new yaw drive 210 may include new yaw adjustment mechanisms 230. Moreover, in a further embodiment, the top flange 214 of the adaptor 202 may be coupled to the used yaw bearing 38 (FIG. 3), such as when the used yaw bearing 38 and/or the used yaw drive 36 (FIG. 3) are reused.

As shown in FIG. 6, in one embodiment, the adaptor 202 of the refurbished wind turbine 200 is coupled between the new machine head 206 and the new yaw bearing 204. More specifically, the top flange 216 of the adaptor 202 may be coupled to the bedplate 226 of the new machine head 206, such as via suitable fasteners 234. Furthermore, the bottom flange 212 of the adaptor 202 may be coupled to the new yaw bearing 204, such as via suitable fasteners 236. For example, as shown, the outer race 222 of the new yaw bearing 204 may be coupled to the bottom flange 212 of the adaptor 202 by the fasteners 236. Similarly, the inner race 220 may be coupled to the top flange 60 of the used tower 12 by suitable fasteners 238. Nevertheless, in alternative embodiments, the outer race 222 may be coupled to top flange 60 of the used tower 12 and the inner race 220 may be coupled to the bottom flange 212 of the adaptor 202. Moreover, in a further embodiment, the bottom flange 212 of the adaptor 202 may be coupled to the used yaw bearing 38 (FIG. 3), such as when the used yaw bearing 38 (FIG. 3) and/or the used yaw drive 36 (FIG. 3) are reused.

Figure 7:
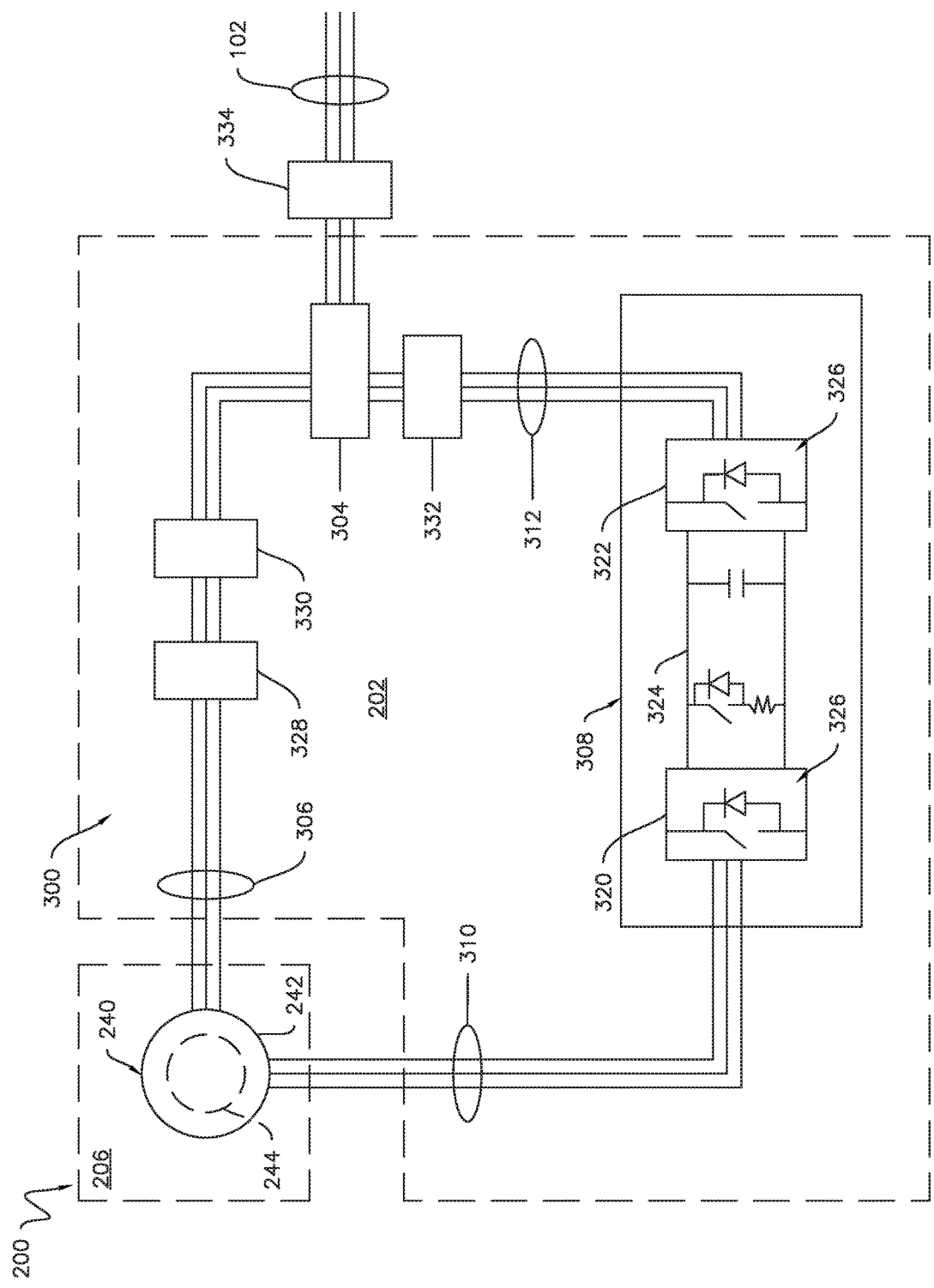
FIG. 7 is a schematic view of one embodiment of a new electrical system installed within an adaptor of a refurbished wind turbine in accordance with aspects of the present disclosure.

Referring now to FIG. 7, the new wind turbine 10 includes a new electrical system 300 that supplies electrical power generated by a generator 240 positioned within the new machine head 206 to the utility grid 102. As shown, the new electrical system 300 may include one or more new electrical components (e.g., power converters, transformers, etc.) positioned within the adaptor 202. In this respect, and as will be described in greater detail below, the various electrical components may be located within the adaptor 202 at different levels or positions along the vertical direction 15. In further embodiments, some of the components of the new electrical system 300 may be located within the adaptor 202, while other components of the new electrical system 300 may be located at other suitable location(s) within the refurbished wind turbine 200 or remote to the refurbished wind turbine 200.

As shown, the new electrical system 300 may be configured to provide AC power to the utility grid 102 via a dual path. More specifically, in the illustrated embodiment, the generator 240 corresponds to a doubly-fed induction generator configured to generate, e.g., three-phase AC power. In this respect, a stator 242 of the generator 240 may be coupled to a new transformer 304 via a stator bus 306. A rotor 244 of the generator 240 may be coupled to a new power converter 308 via a rotor bus 310. The new power converter 308 may, in turn, be coupled to the new transformer 304 via a grid side bus 312. The new transformer 304 may, in turn, be coupled to the utility grid 102. Nevertheless, in alternative embodiments, the generator 240 may be coupled to the grid 102 in any other suitable manner such that power produced by the generator 240 is supplied to the grid 102.

Figure 8:
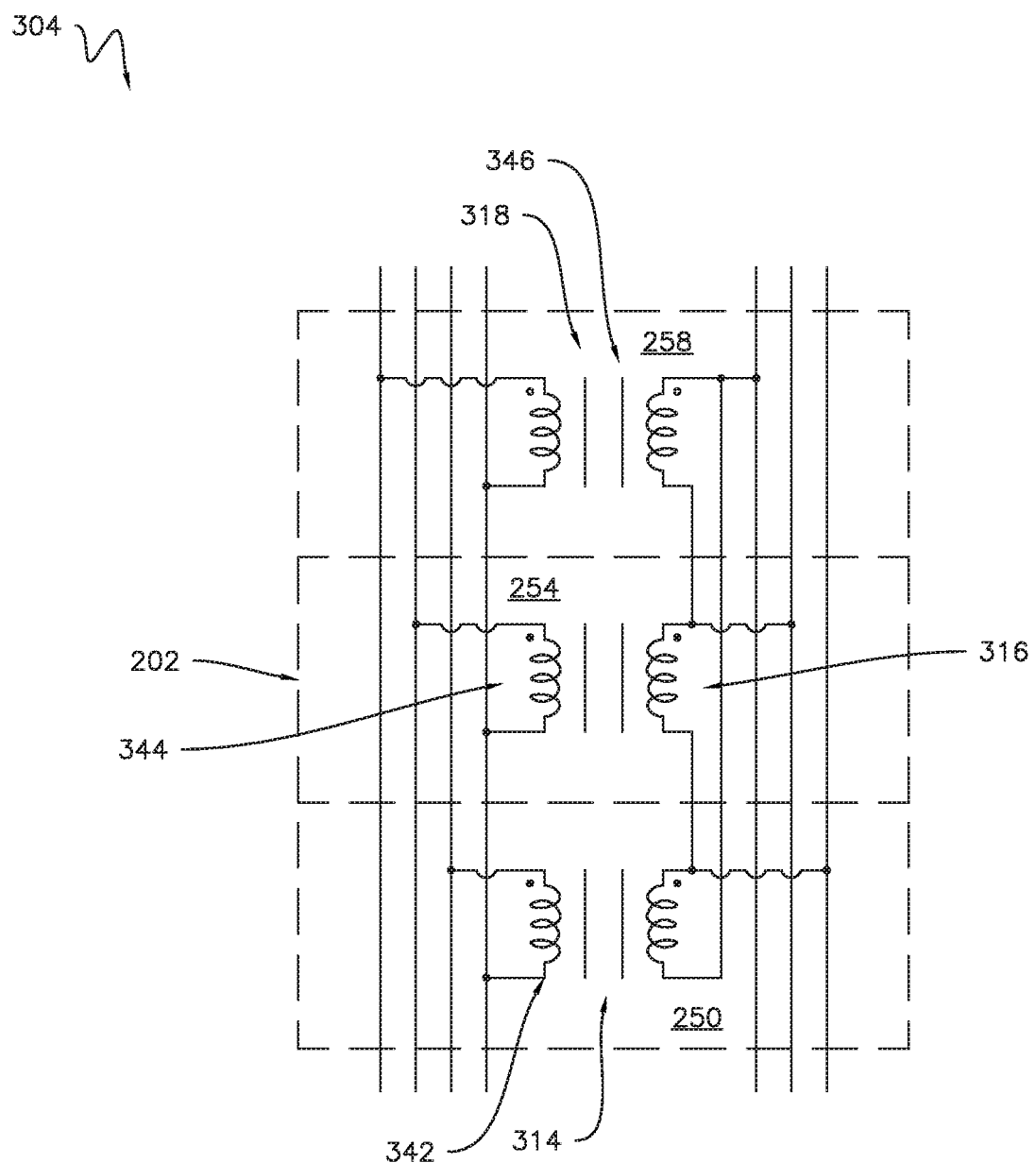
FIG. 8 is a schematic view of one embodiment of a new transformer of the new electrical system shown in FIG. 7 in accordance with aspects of the present disclosure.

In the embodiment shown in FIG. 8, the new transformer 304 corresponds to three distinct single-phase transformers 314, 316, 318 wired or otherwise electrically coupled together to form a single, three-phase transformer. More specifically, the new transformer 304 may include a first single-phase transformer 314, and second single-phase transformer 316 electrically coupled to the first single-phase transformer 314, and a third single-phase transformer 316 electrically coupled to the first and second single-phase transformers 314, 316. As will be described below, three single-phase transformers 314, 316, 318 electrically coupled together may be narrow than a single three-phase transformer (e.g., the used transformer 104). Nevertheless, in alternative embodiments, the new transformer 304 may have any other suitable configuration, such as a single three-phase transformer.

Referring back to FIG. 7, the new power converter 108 generally includes a rotor side converter 320 coupled to the rotor side bus 310 and a grid side converter 322 coupled to the grid side bus 312. The new power converter 308 also includes a DC link 324 coupled between the rotor side and grid side converters 320, 322. In one embodiment, the rotor side converter 320 corresponds to an AC-DC converter configured to convert AC power from the rotor 244 of the generator 240 into DC power for delivery to the DC link 324. Furthermore, the grid side converter 322 corresponds to a DC-AC converter configured to convert DC power from the DC link 324 into AC power suitable for delivery to the utility grid 102. The rotor side and grid side converter 320, 322 may include various switching devices 326, such as insulated gate bipolar transistors, insulated gate commuted thyristors, metal-oxide semiconductor field-effect transistors, and/or silicon controlled rectifiers. In general, the switching devices 326 may be modulated to adjust or otherwise modify various parameters of the power produced by the generator 240 (e.g., change the frequency, convert AC to DC, convert DC to AC, etc.) such that power is suitable for consumption in the grid 102. In alternative embodiments, however, the new power converter 308 may have any other suitable topology.

Moreover, the new electrical system 300 may include various circuit breakers, switches, fuses, contactors, and/or the like to selectively electrically couple and/or decouple various components from the generator 240 and/or the grid 102. For example, in the embodiment shown in FIG. 7, the new electrical system 300 may include a switch 328, a stator bus circuit breaker 330, a grid side bus circuit breaker 332, and a grid circuit breaker 334. Nevertheless, in alternative embodiments, the new electrical system 300 may include other circuit breakers, switches, fuses, and/or contactors in lieu of or in addition to the components 328, 330, 332, 334.

As mentioned above, one or more of the electrical components of the new electrical system 300 are positioned within the adaptor 202 of the refurbished wind turbine 200. For example, in the embodiment illustrated in FIG. 9, the new power converter 308 and the new transformer 304 are positioned within the adaptor 202. More specifically, the adaptor 202 includes a side wall 246 extending between the bottom and top flanges 212, 214 in the vertical direction 15. In this respect, the side wall 246 of the adaptor 202 defines an interior chamber 248 within the adaptor 202. As shown, the new power converter 308 and the new transformer 304 are positioned within the interior chamber 248. For example, in one embodiment, the new power converter 308 and/or the new transformer 304 may be coupled to the side wall 246. In another embodiment, the new power converter 308 and the new transformer 304 may be positioned on platforms (not shown) within the interior chamber 248 of the adaptor 202. In further embodiments, other electrical components of the new electrical system 300 (e.g., the various buses, switches, circuit breakers, etc.) may be positioned within the adaptor 202 in addition to or in lieu of the new power converter 308 and the new transformer 304.

Moreover, the interior chamber 248 of the adaptor 202 may define a plurality of levels, with each level occupying a different portion of the interior chamber 248 along the vertical direction 15. For example, as shown, the interior chamber 248 may include a first level 250 extending between the bottom flange 212 of the adaptor and a dashed line 252. The interior chamber 248 also includes a second level 254 positioned above the first level 250 in the vertical direction 15, with the second level 254 extending between the dashed line 254 and a dashed line 256. Furthermore, the interior chamber 248 also includes a third level 258 positioned above the second level 254 in the vertical direction 15, with the third level 258 extending between the dashed line 256 and the top flange 214 of the adaptor 202. Nevertheless, the interior chamber 248 of the adaptor 202 may include more or fewer levels, such as two levels or four or more levels.

In several embodiments, components of the new power converter 308 and/or the new transformer 304 may be located at different vertical positions within the adaptor 202. Positioning portions of the new power converter 308 and/or the new transformer 304 at different vertical positions may reduce the foot print of these components 304, 308 compared to the used power converter and transformer 108, 104, thereby minimizing a diameter of the adaptor 202. More specifically, in one embodiment, the new power converter 308 may include a first power converter portion 336 positioned within the first level 250 of the interior chamber 248, a second power converter portion 338 positioned within the second level 254 of the interior chamber 248, and a third power converter portion 340 positioned within the third level 258 of the interior chamber 248. In one exemplary embodiment, the first, second, and third power converter portions 336, 338, 340 may respectively correspond to the grid side converter 322, the rotor side converter 320, and a power cabinet (not shown). In another exemplary embodiment, the first, second, and third power converter portions 336, 338, 340 may respectively correspond to both converters 320, 322; the control cabinet (not shown); and the power cabinet. Nevertheless, in alternative embodiments, the new power converter 308 may include more or fewer of portions and/or the portions of the power converter 308 may correspond to any other suitable power converter component or combination of power converter components. Similarly, the new transformer 304 may include a first transformer portion 342 positioned within the first level 250 of the interior chamber 248, a second transformer portion 344 positioned within the second level 254 of the interior chamber 248, and a third transformer portion 346 positioned within the third level 258 of the interior chamber 248. For example, in one embodiment, as shown in FIG. 8, the first transformer portion 342 may correspond to the first single-phase transformer 314, the second transformer portion 344 may correspond to the second single-phase transformer 316, and the third transformer portion 346 may correspond to the third single-phase transformer 318. Nevertheless, in alternative embodiments, the new transformer 304 may include more or fewer of portions and/or the portions of the transformer 304 may correspond to any other suitable transformer component or combination of transformer components.

Figure 9:
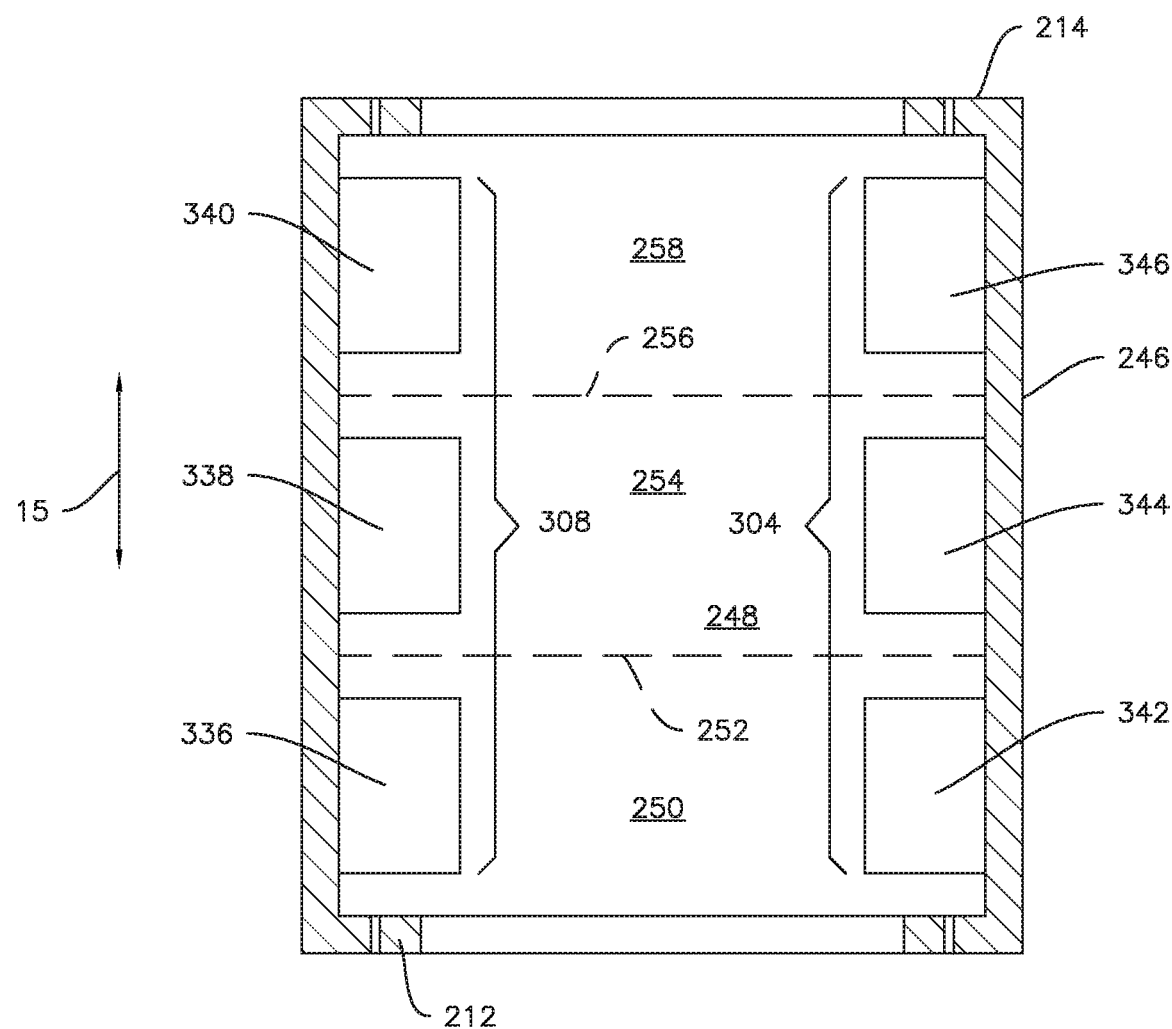
FIG. 9 is a cross-sectional view of one embodiment of an adaptor for use in refurbishing a used wind turbine, illustrating one or more new electrical components positioned within the adaptor in accordance with aspects of the present disclosure.

Additionally, as shown in FIG. 9, one or more portions of the new power converter 308 may be aligned with one or more portions of the new transformer 304 along the vertical direction 15. For instance, the first power converter and transformer portions 336, 342 may be aligned along the vertical direction 15, the second power converter and transformer portions 338, 344 may be aligned along the vertical direction 15, and/or the third power converter and transformer portions 340, 346 may be aligned along the vertical direction 15. Nevertheless, in alternative embodiments, the new power converter 308 and/or the new transformer 304 may include any other suitable number of components or portions and such components or portions may be positioned at any other suitable location within the adaptor 202.

Figure 10:
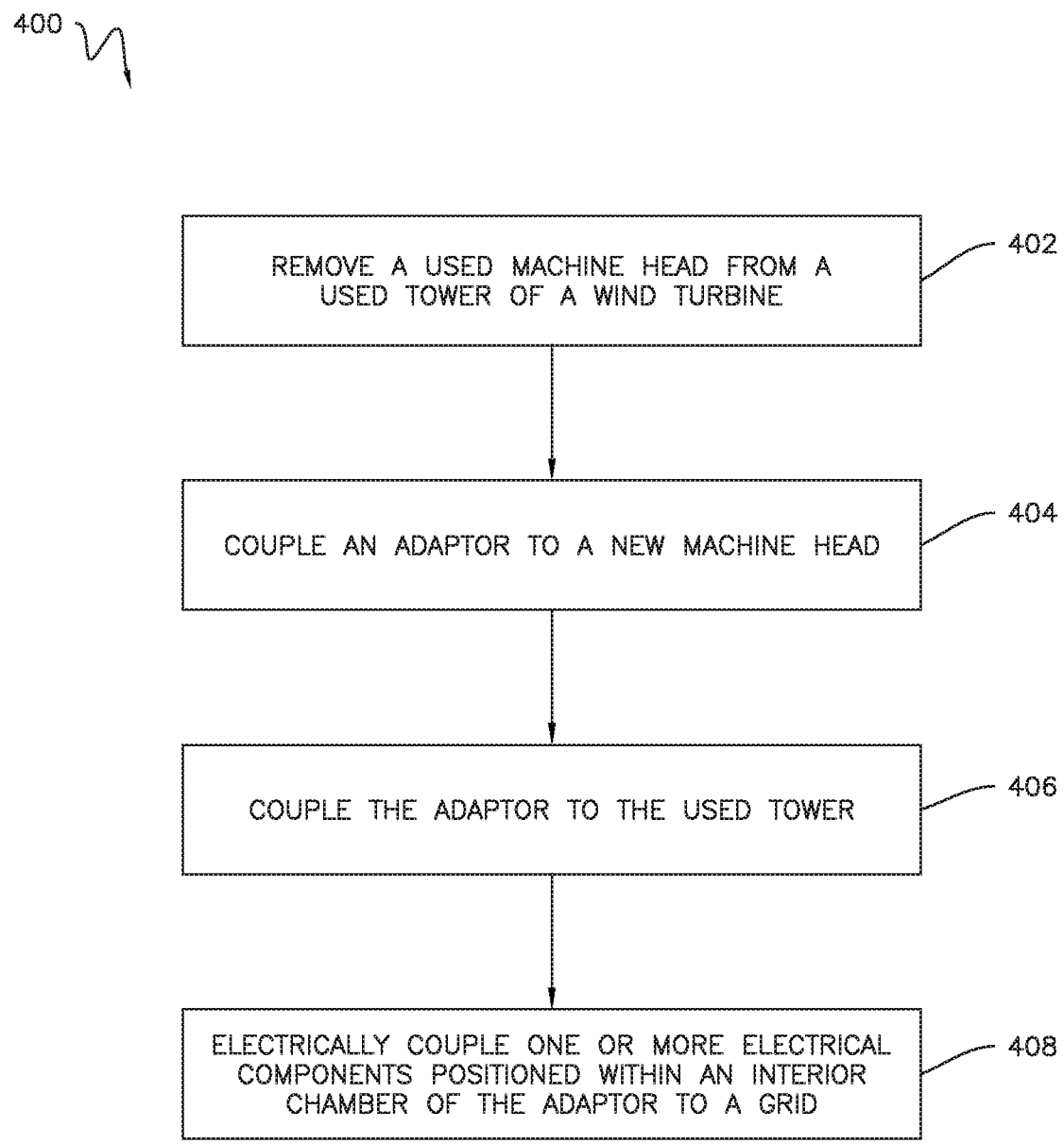
FIG. 10 is a flow chart illustrating one embodiment of a method for refurbishing a wind turbine in accordance with aspects of the present disclosure.

FIG. 10 illustrates one embodiment of a method 400 for refurbishing a wind turbine in accordance with aspects of the present subject matter. Although FIG. 10 depicts steps performed in a particular order for purposes of illustration and discussion, the methods discussed herein are not limited to any particular order or arrangement. As such, the various steps of the methods disclosed herein can be omitted, rearranged, combined, and/or adapted in various ways without deviating from the scope of the present disclosure.

As shown in FIG. 10, at (402), the method 400 may include removing a used machine head from a used tower of the wind turbine. For example, as described above, the used machine head 16 of the used wind turbine 10 may be removed from the used tower 12 of the used wind turbine 10.

At (404), the method 400 may include coupling an adaptor to a new machine head. For example, as described above, the top flange 216 of the adaptor 202 may be coupled to the new machine head 206. In one embodiment, the top flange 216 of the adaptor 202 may be coupled to the new yaw bearing 204 or the used yaw bearing 38, which is, in turn, coupled to the bedplate 226 of the new machine head 16 as shown in FIG. 5. In another embodiment, the top flange 216 of the adaptor 202 may be coupled directly to the bedplate 226 of the new machine head 16 as shown in FIG. 6.

Moreover, at (406), the method 400 may include coupling the adaptor to the used tower. For example, as described above, the bottom flange 212 of the adaptor 202 may be coupled to the used tower 12. In one embodiment, the bottom flange 212 of the adaptor 202 may be coupled directly to the top flange 60 of the used tower 12 as shown in FIG. 5. In another embodiment, the bottom flange 212 of the adaptor 202 may be coupled to the new yaw bearing 204 or the used yaw bearing 38, which is, in turn, coupled to the top flange 60 of the used tower 12 as shown in FIG. 6.

Additionally, as shown in FIG. 10, at (408), the method 400 may include electrically coupling the one or more electrical components positioned within an interior chamber of the adaptor to a grid. For example, as described above, one or more electrical components of the new electrical system 300, such as the new power converter 308 and/or the new transformer 304, may be positioned within the interior chamber 248 defined by the adaptor 202. As such, these components may be electrically coupled to the grid 102 by various buses, switches, and/or circuit breakers, such as the stator bus 306, the rotor bus 310, the grid side bus 312, the switch 328, the stator bus circuit breaker 330, the grid side circuit breaker 332, and/or the grid circuit breaker 334.

As described in greater detail above, the refurbished wind turbine 200 includes the adaptor 202 in which one or more components of the new electrical system 300 (e.g., the new power converter 308 and/or the new transformer 304) are positioned. In this respect, and unlike with conventional wind turbines, the refurbished wind turbine 200 does not require removal of the used power converter and/or transformer or construction of a structure to house the new power converter and/or transformer, thereby reducing the overall expense of a refurbishment operation.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A wind turbine, comprising:
   a tower;
   a machine head including a generator;
   a rotor mechanically coupled to the generator, the rotor including a hub and at least one rotor blade coupled to and extending outwardly from the hub;
   one or more used electrical components electrically decoupled from the generator, the one or more used electrical components positioned within the tower;
   an adaptor coupled between the tower and the machine head, the adaptor defining an interior chamber; and
   one or more new electrical components electrically coupled to the generator, the one or more new electrical components being positioned within the interior chamber defined by the adaptor.

2. The wind turbine of claim 1, wherein the one or more new electrical components comprise a transformer.

3. The wind turbine of claim 2, wherein the transformer comprises a plurality of single-phase transformers.

4. The wind turbine of claim 2, wherein the interior chamber defined by the adaptor comprises a first level, a second level positioned above the first level, and a third level positioned above the second level, the transformer comprising a first single-phase transformer positioned within the first level of the interior chamber, a second single-phase transformer positioned within the second level of the interior chamber, and a third single-phase transformer positioned within the third level of the interior chamber.

5. The wind turbine of claim 1, wherein the one or more new electrical components comprise a power converter.

6. The wind turbine of claim 5, wherein the interior chamber defined by the adaptor comprises a first level, a second level positioned above the first level, and a third level positioned above the second level, the power converter comprising a first power converter portion positioned within the first level of the interior chamber, a second power converter portion positioned within the second level of the interior chamber, and a third power converter portion positioned within the third level of the interior chamber.

7. The wind turbine of claim 1, wherein the one or more new electrical components comprise a power converter and a transformer, a portion of the power converter being vertically aligned with a portion of the transformer.

8. A wind turbine, comprising:
   a tower including a top flange;
   a machine head including a generator and a bedplate;
   a rotor mechanically coupled to the generator, the rotor including a hub and at least one rotor blade coupled to and extending outwardly from the hub;
   a yaw bearing including a first race and a second race;
   one or more used electrical components electrically decoupled from the generator, the one or more used electrical components positioned within the tower;
   an adaptor coupled between the yaw bearing and one of the tower or the machine head, the adaptor defining an interior chamber, the adaptor further including a top flange and a bottom flange, the top flange of the adaptor being coupled to one of the bedplate of the machine head or the yaw bearing, the bottom flange being coupled to one of the top flange of the tower or the yaw bearing; and
   one or more new electrical components electrically coupled to the generator, the one or more new electrical components being positioned within the interior chamber defined by the adaptor.

9. The wind turbine of claim 8, wherein the one or more new electrical components comprise a transformer.

10. The wind turbine of claim 9, wherein the transformer comprises a plurality of single-phase transformers.

11. The wind turbine of claim 9, wherein the interior chamber defined by the adaptor comprises a first level, a second level positioned above the first level, and a third level positioned above the second level, the transformer comprising a first single-phase transformer positioned within the first level of the interior chamber, a second single-phase transformer positioned within the second level of the interior chamber, and a third single-phase transformer positioned within the third level of the interior chamber.

12. The wind turbine of claim 8, wherein the one or more new electrical components comprise a power converter.

13. The wind turbine of claim 12, wherein the interior chamber defined by the adaptor comprises a first level, a second level positioned above the first level, and a third level positioned above the second level, the power converter comprising a first power converter portion positioned within the first level of the interior chamber, a second power converter portion positioned within the second level of the interior chamber, and a third power converter portion positioned within the third level of the interior chamber.

14. The wind turbine of claim 8, wherein the one or more new electrical components comprise a power converter and a transformer, a portion of the power converter being vertically aligned with a portion of the transformer.

15. A method for refurbishing a wind turbine, the method comprising:
removing a used machine head from a used tower of the wind turbine;
coupling an adaptor to a new machine head, the adaptor defining an interior chamber and one or more new electrical components positioned within the interior chamber, the one or more new electrical components electrically coupled to a generator of the new machine head;
coupling the adaptor to the used tower, the used tower including one or more used electrical components electrically decoupled from the generator; and
electrically coupling the one or more new electrical components positioned within the interior chamber of the adaptor to a grid.

16. The method of claim 15, further comprising:
removing a used yaw bearing from the wind turbine; and
coupling a new yaw bearing to the adaptor and one of the new machine head or the used tower.

17. The method of claim 15, wherein the one or more new electrical components comprise a transformer and a power converter.

18. The method of claim 17, wherein the transformer comprises a plurality of single-phase transformers.

19. The method of claim 17, wherein a portion of the power converter is vertically aligned with a portion of the transformer.

20. The method of claim 17, wherein the interior chamber defined by the adaptor comprises a first level, a second level positioned above the first level, and a third level positioned above the second level, the transformer comprising a first single-phase transformer positioned within the first level of the interior chamber, a second single-phase transformer positioned within the second level of the interior chamber, and a third single-phase transformer positioned within the third level of the interior chamber, the power converter comprising a first power converter portion positioned within the first level of the interior chamber, a second power converter portion positioned within the second level of the interior chamber, and a third power converter portion positioned within the third level of the interior chamber.

* * * * *